United States Patent
Lu

(10) Patent No.: US 12,083,910 B1
(45) Date of Patent: Sep. 10, 2024

(54) DEVICE FOR ADJUSTING POLARITIES OF VEHICLE CLAMPS AND STARTING SYSTEM

(71) Applicant: SHENZHEN DOMORE TECHNOLOGY LTD, Guangdong (CN)

(72) Inventor: Jing Lu, Guangdong (CN)

(73) Assignee: SHENZHEN DOMORE TECHNOLOGY LTD, Shenzhen (CN)

( * ) Notice: Subject to any disclaimer, the term of this patent is extended or adjusted under 35 U.S.C. 154(b) by 0 days.

(21) Appl. No.: 18/629,869

(22) Filed: Apr. 8, 2024

(30) Foreign Application Priority Data

Feb. 2, 2024 (CN) .......................... 202420266356.9

(51) Int. Cl.
| | |
|---|---|
| *H02J 7/00* | (2006.01) |
| *B60L 53/16* | (2019.01) |
| *H02J 7/02* | (2016.01) |
| *H02J 7/14* | (2006.01) |

(52) U.S. Cl.
CPC ................ *B60L 53/16* (2019.02); *H02J 7/02* (2013.01)

(58) Field of Classification Search
CPC ......... B60L 53/16; B60L 53/18; B60L 53/22; H02J 7/02; H02J 7/0034; H02J 7/0045
USPC ................................................. 320/109, 134
See application file for complete search history.

(56) References Cited

U.S. PATENT DOCUMENTS

| | | | |
|---|---|---|---|
| 11,303,122 B1* | 4/2022 | Zhu .................... | H02J 1/122 |
| 11,489,336 B1* | 11/2022 | Binder ................. | H02J 1/06 |
| 11,545,842 B1* | 1/2023 | Liu .................. | G01R 19/16542 |
| 11,637,436 B2* | 4/2023 | Wu ..................... | H02J 7/0034 |
| | | | 320/107 |
| 11,686,778 B1* | 6/2023 | Wu ..................... | F02N 11/0862 |
| | | | 324/432 |
| 2022/0123581 A1* | 4/2022 | Clarke ................ | H01M 10/44 |
| 2022/0376523 A1* | 11/2022 | Brumley, Jr. ........... | F02N 15/00 |
| 2023/0131479 A1* | 4/2023 | Qin ..................... | H02J 7/00308 |
| | | | 320/137 |
| 2024/0039315 A1* | 2/2024 | Wu ..................... | H02J 7/0045 |
| 2024/0154412 A1* | 5/2024 | Nook .................... | H02J 7/0047 |

* cited by examiner

*Primary Examiner* — Alexis B Pacheco

(57) ABSTRACT

A device for adjusting the positive and negative polarities of vehicle charging clamps includes a polarity determining module, a polarity conversion module, first and second clamps configured to connect to two electrodes of a vehicle battery. The polarity determining module is configured to determine positive and negative polarities of the two electrodes of the vehicle battery to which the first clamp and the second clamp are respectively connected; the polarity conversion module is configured to control the positive and negative polarities adjustment so that the first clamp and the second clamp are respectively connected with the positive electrode and the positive electrode of the external power supply and circuits are turned on for vehicle charging, or the first clamp and the second clamp are respectively connected with the negative electrode and the positive electrode of the external power supply and circuits are turned on for vehicle charging.

10 Claims, 4 Drawing Sheets

DEVICE FOR ADJUSTING POLARITIES OF VEHICLE CLAMPS AND STARTING SYSTEM

CROSS-REFERENCE TO RELATED APPLICATIONS

The present application claims priority of Chinese Utility Model Application No. 202420266356.9, filed on Feb. 2, 2024, the entire contents of which are hereby incorporated by reference.

TECHNICAL FIELD

The invention relates to the technical field of new energy vehicles, and in particular to a device for adjusting the positive and negative polarities of charging clamps of a vehicle, and a starting system.

BACKGROUND

With the widespread popularity of new energy vehicles, vehicle emergency power supplies (also known as vehicle emergency starting power supplies) are becoming more and more widely used. Specifically, the vehicle emergency power supply is mainly configured to provide the required starting power for the vehicle. When the vehicle emergency power supply is out of power, the vehicle emergency power supply can be charged by connecting to battery charging clamps. However, since there are positive and negative electrodes on the power supply, users need to carefully check and ensure that the positive and negative polarities are connected correctly between the power supply and the vehicle charging clamps. Otherwise, short circuits, burned-out circuit lights, and inability to charge will occur.

In the existing technology, polarity marking is carried out by labelling, etc. This method is neither efficient nor safe, and cannot avoid problems such as short circuits and burned circuits caused by incorrect connections.

SUMMARY

The objective of this invention is to provide a device for adjusting the positive and negative polarities of two charging clamps of a vehicle, and a starting system thereof, which can automatically identify the positive and negative electrodes of the vehicle battery connected to the charging clamp and correspondingly automatically switch between positive and negative polarities to the charging clamp when charging the vehicle emergency power supply, so that the polarities of the two clamps and the corresponding two electrodes of the vehicle battery to which the two clamps are connected are consistent, therefore charging efficiency and safety is improved.

To solve the above technical problems, embodiments of the present invention provide a device for adjusting positive and negative polarities of clamps for vehicle charging, comprising: a polarity determining module, a polarity conversion module having a first input and two outputs, a first clamp and a second clamp.

The polarity determining module comprises a first resistor, a second resistor, a third resistor, a fourth resistor and a Microcontroller unit (MCU), wherein an eighth pin of the MCU is connected to one end of the second resistor and one end of the fourth resistor respectively, an other end of the fourth resistor is configured to connect to a negative electrode of an external power supply, and an other end of the second resistor is connected to the first input of the polarity conversion module, the other end of the second resistor is further configured to connect to a positive electrode of the external power supply, an eleventh pin of the MCU is respectively connected to one end of the first resistor and one end of the third resistor, an other end of the third resistor is configured to connect to the negative electrode of the external power supply, and an other end of the first resistor is connected to the second clamp.

The polarity determining module is configured to determine positive and negative polarities of two electrodes of a vehicle battery to which the first clamp and the second clamp are respectively connected.

The polarity conversion module further includes a second input, a third input and a fourth input respectively connected to different pins of the MCU, and the two outputs of the polarity conversion module are both connected to the first clamp and to the second clamp.

The polarity conversion module is configured to control the positive and negative polarities adjustment according to the determining result of the polarity determining module so that the first clamp and the second clamp are respectively connected with the positive electrode and the negative electrode of the external power supply and circuits are turned on for vehicle charging, or the first clamp and the second clamp are respectively connected with the negative electrode and the positive electrode of the external power supply and circuits are turned on for vehicle charging.

The first clamp and the second clamp are configured to connect to the two electrodes of the vehicle battery respectively.

Another embodiment of the present invention also provides a starting system, which comprises an external power supply and a device for adjusting the positive and negative polarities of the two clamps of a vehicle as described above.

Compared with the existing technology, the embodiments of the present invention can automatically identify or detect the positive and negative polarity of the two electrodes of the vehicle battery to which the two charging clamps are connected when the vehicle emergency power supply is to be charged, and automatically switch positive and negative polarity on the corresponding charging clamps to make the circuits being turned on for charging. It eliminates the need to mark the positive and negative electrodes of the vehicle emergency power supply in advance, and there is no need to manually adjust the connection of the clamps when the clamps are reversely connected to the vehicle emergency power supply, which improves charging efficiency and safety.

BRIEF DESCRIPTION OF DRAWINGS

One or more embodiments are exemplified by the pictures in the corresponding drawings. These illustrative illustrations do not constitute limitations to the embodiments. Elements with the same reference numerals in the drawings are represented as similar elements. Unless otherwise stated, the figures in the drawings are not intended to be limited to scale.

The present invention will be further described concerning the embodiments and the accompanying drawings.

DESCRIPTION OF EMBODIMENTS

The In order to make the inventive objects, features, and advantages of the present disclosure more apparent and understandable, technical solutions in the embodiments of the present disclosure will be described clearly and completely in conjunction with accompanying drawings in the embodiments of the present disclosure. Evidently, the described embodiments are only a part of the embodiments of the present disclosure, but not all the embodiments of the present disclosure. Based on the embodiments of the present disclosure, all other embodiments obtained by those skilled in the art without creative efforts shall fall within a protection scope of the present disclosure.

The first embodiment of the present invention relates to a device for adjusting the positive and negative polarities of clamps for vehicle charging. The specific structure of the device for adjusting the positive and negative polarities of clamps for vehicle charging is shown in FIG. 1, and comprises a polarity determining module 11, a polarity conversion module 12, a first clamp 13 and a second clamp 14.

Figure 1:
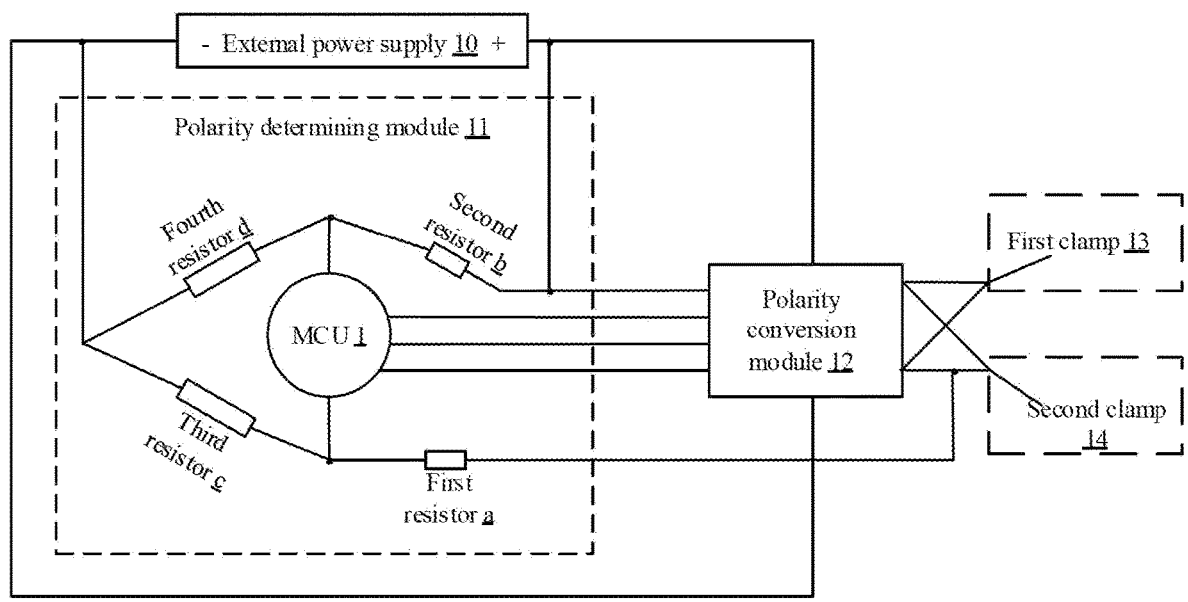
FIG. 1 is a module schematic diagram of a device for adjusting the positive and negative polarities of vehicle charging clamps according to the first embodiment of the present invention.

Specifically, the polarity determining module 11 comprises a first resistor a, a second resistor b, a third resistor c, a fourth resistor d and a Microcontroller unit (MCU) 1, wherein the eighth pin of the MCU 1 is connected to one end of the second resistor b and is connected to one end of the fourth resistor d, and the other end of the fourth resistor d is configured to connect to the negative electrode of the external power supply (FIG. 1 is a schematic diagram of the connection with the external power supply). The other end of the second resistor b is connected to the first input of the polarity conversion module 12, and the other end of the second resistor b is also configured to connect to the positive electrode of the external power supply 10. The eleventh pin of the MCU 1 is respectively connected to one end of the first resistor a and one end of the third resistor c. The other end of the third resistor c is configured to connect to the negative electrode of the external power supply 10. The other end of the first resistor a is connected to the second clamp 14.

The polarity determining module 11 is configured to determine positive and negative polarities of two electrodes of the vehicle battery to which the first clamp 13 and the second clamp 14 are respectively connected, and to determine the positive and negative polarities of the first clamp 13 and the second clamp 14 when they are connected to the vehicle battery respectively.

Specifically, when the first clamp 13 and the second clamp 14 are connected to the two electrodes of the vehicle battery, and the polarity conversion module 12 (specifically, it can be a switch in the polarity conversion module 12 connected to the first clamp and connected to the external power supply, and a switch connected to the ninth resistor) is connected to the positive electrode of the external power supply and the first clamp 13, the polarity determining module 11 is configured to calculate the resistance Rx between the first clamp 13 and the second clamp 14 according to the first resistor a, the second resistor b, the third resistor c, the fourth resistor d, and the voltage value measured at the eighth pin and the eleventh pin of the MCU, and then determines whether the first clamp 13 and the second clamp 14 is connected to the positive electrode or the negative electrode according to the resistance Rx.

The second input, the third input, and the fourth input of the polarity conversion module 12 are respectively connected to different pins of the MCU 1 (for example, the second input of the polarity conversion module 12 is connected to the third pin of the MCU 1, the third input of the polarity conversion module 12 is connected to the sixth pin of the MCU 1, the fourth input of the polarity conversion module 12 is connected to the ninth pin of the MCU 1), and two output of the polarity conversion module 12 are both connected to the first clamp 13 and the second clamp 14.

The polarity conversion module 12 is configured to control the positive and negative polarity adjustment according to the determining result of the polarity determining module 11 so that the first clamp 13 and the second clamp 14 are respectively connected with the positive electrode and the negative electrode of the external power supply and circuits are turned on for vehicle charging, or the first clamp 13 and the second clamp 14 are respectively connected to the negative electrode and the positive electrode of the external power supply and circuits are turned on for vehicle charging. That is to say, the polarity conversion module 12 can adjust the polarity of the first clamp 13 and the second clamp 14 according to the determining result of the polarity determining module 11 so that the first clamp 13 and the second clamp 14 are connected to the corresponding electrodes of the external power supply according to the polarity of the two electrodes of the vehicle battery to which the two clamps are connected. There is no need to mark the positive and negative electrodes of the vehicle emergency power supply in advance, and there is no need to determine the positive and negative polarities of the two clamps or the positive and negative electrodes of the vehicle battery in advance. The two clamps can be randomly connected to the two electrodes of the vehicle battery, and the two electrodes of the external power supply can also be electrically connected to the corresponding positive and negative electrodes of the vehicle battery through the two connecting clamps. There is no need to manually adjust the connection between the clamps and the vehicle battery when the connecting clamps and the vehicle emergency power supply are reversely connected.

The first clamp 13 and the second clamp 14 are configured to connect to the two electrodes of the vehicle battery respectively.

In the embodiment, the MCU (Microcontroller Unit) can be an SQ2711 chip, which has 16 pins. The first connection clamp and the second connection clamp are two clamps configured to connect to the two electrodes of the vehicle battery when charging the vehicle and are also called vehicle charging clamps.

Figure 3:
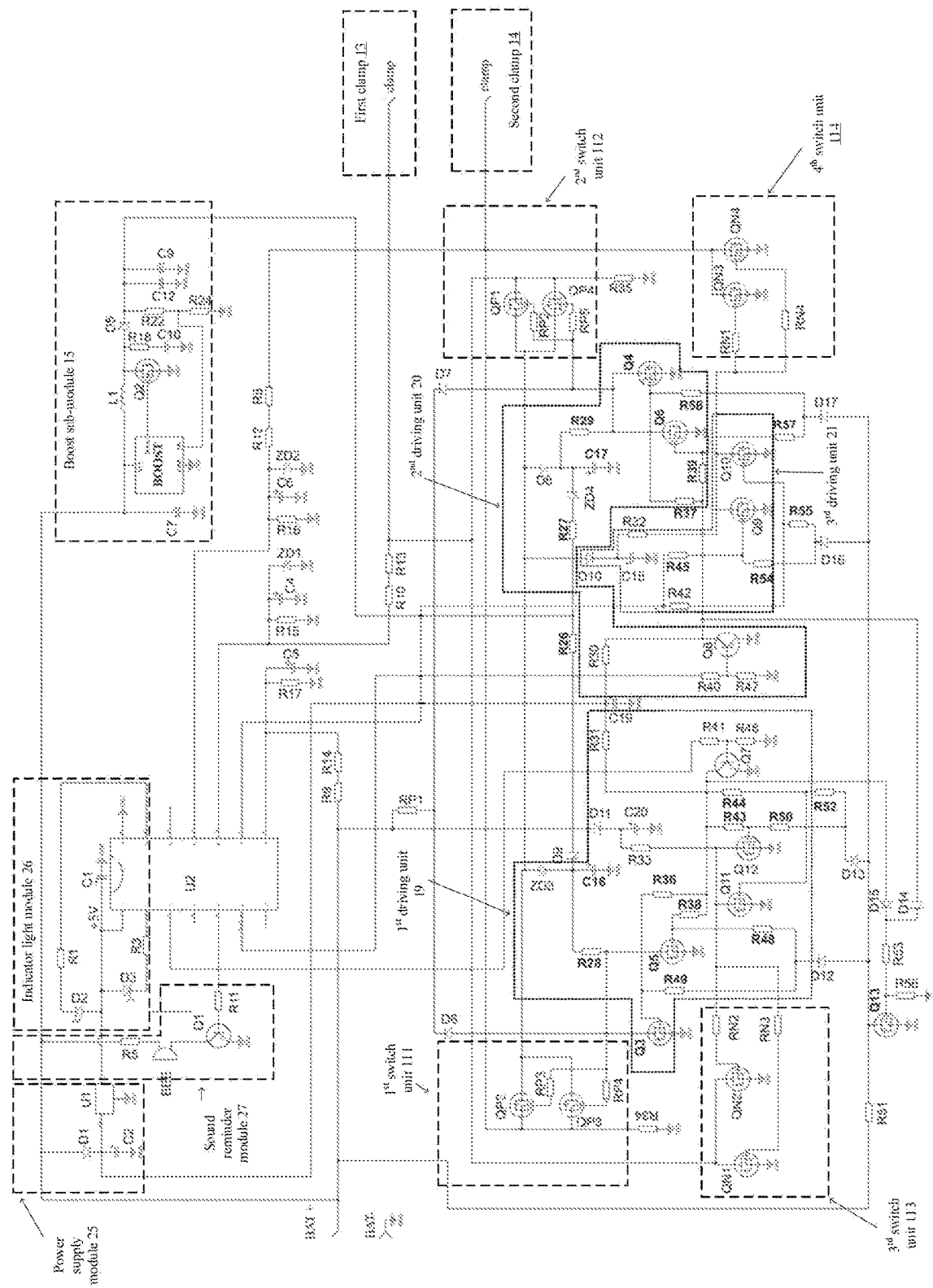
FIG. 3 is a detailed circuit schematic diagram of the device for adjusting the positive and negative polarities of vehicle charging clamps in the present invention.

In a specific implementation, the eighth resistor may be a resistor or include at least two resistors connected in series (for example, including a high-precision resistor and a low-precision resistor in series, such as $R_8$ and $R_{12}$ in FIG. 3). Similarly, the second resistor b ($R_9$ and $R_{14}$ in FIG. 3), the third resistor c, and the fourth resistor d may all be one resistor or include at least two resistors connected in series.

In specific implementation, the first clamp 13 can be connected to the positive electrode or the negative electrode of the vehicle battery; similarly, the second clamp 14 can be connected to the positive electrode or the negative electrode of the vehicle battery.

Specifically, when the first clamp 13 and the second clamp 14 are connected to the two electrodes of the vehicle battery respectively (at this time, the user can connect the two clamps randomly to the two electrodes of the vehicle battery), and the device for adjustment of the positive and negative polarities of the vehicle charging clamp described in this embodiment is connected to the external power supply and after power-on, the MCU 1 initially defaults that the first clamp 13 is connected to the positive electrode of the vehicle battery, and the second clamp 14 is connected to the negative electrode of the vehicle battery, and proceeds with polarity determination. The vehicle battery is not charged (that is, the MCU 1 sends a signal to the polarity conversion module 12 at a certain frequency to adjust the ON-OFF status of each sub-module in the polarity conversion module so that the first clamp 13 is instantly connected to the positive electrode of the external power supply. The polarity is determined based on the resistance value and voltage value obtained at the moment of conduction or ON status).

Furthermore, other pins of the MCU 1 can also be connected to the positive and negative electrodes of the external power supply respectively, and the voltage of the external power supply can be obtained through the pins of the MCU 1. For example, the first pin of the MCU 1 is connected to the positive electrode of the external power supply, and the fourteenth pin of the MCU 1 is connected to the negative electrode of the external power supply. If the MCU 1 determines that the voltage of the external power supply is safe, the polarity determining module 11 determines the positive and negative polarities connected to the first clamp and the second clamp.

Alternatively, it is also possible to directly determine the positive and negative polarities of the vehicle battery connected to the first clamp 13 and the second clamp 14 by the polarity determining module 11 without obtaining the voltage of the external power supply. Specifically, based on the connection circuit of the polarity determining module 11, the voltage difference between the eighth pin and the eleventh pin of the MCU 1 is obtained, and the resistance value $R_x$ to be calculated between the two clamps when the first clamp 13 and the second clamp 14 are clamped to the vehicle battery is determined according to the voltage difference. According to the resistance value to be calculated, it is determined whether the positive and negative electrodes of the vehicle battery to which the first clamp 13 and the second clamp 14 are connected are consistent with the initial default polarities. If they are consistent, the charging is controlled to be enabled. If they are inconsistent (that is, the user connects the first clamp 13 to the negative electrode of the vehicle battery, and the user connects the second clamp 14 to the positive electrode of the vehicle battery), then the MCU 1 sends a signal to the polarity conversion module 12 to adjust the ON-OFF status of each sub-module in the polarity conversion module, so that the polarity of the first clamp 13 is switched and the first clamp 13 is connected to the negative electrode of the external power supply, and the polarity of the second clamp 14 is switched and the second connection clamp 14 is connected to the positive electrode of the external power supply. Therefore, the vehicle battery is charged through the external power supply 10, the first clamp 13, and the second clamp 14 through the turned-on circuits. Based on this, we only need to rely on the resistance value in the circuit to automatically analyze the right or wrong connections when the two clamps are connected to the battery. The overall circuit structure is simple and the resistor is used as the main component, which can also greatly reduce the size after making the circuit board and provide wide universal application.

Specifically, the resistance value of $R_x$ to be calculated can be obtained through experiments according to the circuit resistance value and can be a preset threshold value. If the resistance to be calculated is greater than the preset threshold and does not tend to be infinity, it is determined that the positive and negative electrodes of the vehicle battery to which the first clamp 13 and the second clamp 14 are connected are consistent with the initial default polarity; if the resistance to be calculated is less than the preset threshold, it is determined that the positive and negative electrodes of the vehicle battery to which the first clamp 13 and the second clamp 14 are connected are inconsistent with the initial default polarity.

For example, if the resistance value to be calculated is greater than 10Ω and does not tend to be infinity, then it is determined that the positive and negative electrodes of the vehicle battery to which the first clamp 13 and the second clamp 14 are connected are consistent with the initial default polarity; if the resistance value to be calculated is less than 10Ω, it is determined that the positive and negative electrodes of the vehicle battery to which the first clamp 13 and the second clamp 14 are connected are inconsistent with the initial default polarity.

Specifically, the calculation principle of the circuit based on the polarity determining module is as follows:

Definition: $V_8$ is the voltage generated by the external power supply shown in the figure and read from the eighth pin of MCU 1;

$V_{11}$ is the voltage generated by the external power supply shown in the figure and read from the eleventh pin of MCU 1;

$$V_x = V_8 - V_{11}$$

$R_x$ is the resistance value to be calculated between the two clamps;

$R_{xa}$ is the equivalent resistance of onboard electrical appliances such as vehicle dashboards;

$R_{xb}$: equivalent resistance of vehicle battery;

(1) When there is no battery in the vehicle (or the battery is broken or has no power), the resistance value to be calculated between the two clamps is equal to $R_{xa}$ of onboard electrical appliances such as a vehicle dashboard. This makes the eighth resistor (i.e. $R_8$), the ninth resistor (i.e. $R_9$), the fourth resistor (i.e. $R_{17}$) and the third resistor (i.e. $R_{16}$) of the connection circuits of the polarity determining module 11 form a bridge circuit, then there is:

Assume: $R_8=9.0KΩ$, $R_{16}=R_{17}=1$ KΩ, $R_9=10$ KΩ, external power supply voltage V=15v.

According to the bridge principle, when $V_8=V_{11}$, that is, Vx=0, the products of the resistances on opposite sides are equal, That is $(R_x+R_8)*R17=R_9*R_{16}$.

$$R_x=(R9*R_{16}/R_{17})-(R8)=1.0 KΩ$$

At this time, $V_8=V_{11}=(1/11)*15=1.363$ V, that is, $V_x=0$.

Assume Rx=∞, that is, the clamp is in an open circuit state.

At this time $V_{11}→0$ V, $V_8=(1/11)*15=1.363V$.

$Vx=V_8-V_{11}=1.363V$, that is, Vx=the maximum value of Vx.

Assume $R_x=10$ KΩ.

At this time, $V_{11}=1/(10+9)*15=0.789V$, $V_8=(1/11)*15=1.363V$.

$V_x=V_8-V_{11}=0.574$ V, that is, $V_x>0$

Assume $R_x=0$ KΩ,

At this time $V_{11}=(1/10)*15=1.500$ V, $V_8=(1/11)*15=1.363V$.

$V_x=V_8-V_{11}=-0.137$ V, that is, $V_x<0$.

It is proved that: when $R_x=\infty$, $V_x$ is the maximum (that is, the difference between $V_8$ and $V_{11}$ is the maximum), and when Rx=0, $V_x$ is the minimum (i.e. the difference between $V_8$ and $V_{11}$ is the minimum). That is $R_x \propto V_x$.

Based on the above principle, by measuring the voltage of the eighth and eleventh pins of the MCU and calculating the value of $V_x$ (according to $V_x=V_8-V_{11}$), the value of $R_x$ can be deduced and calculated.

(2) When the vehicle battery is connected, there are two situations:

a) Vehicle battery voltage>external battery voltage

When the connecting clamp is connected to the vehicle, the vehicle battery is charging to the external battery through the ninth resistor $R_9$. At this time, the charging current offsets the current output by the external battery, so that: $V_{11} \rightarrow 0$, Vx→Vx maximum value.

Because: $R_x \propto V_x$

Therefore: at this time, $R_x \rightarrow \infty$. It is equivalent to the clamp being suspended, and the program will not enter to the next step (that is, charging will not occur).

b) Vehicle battery voltage≤external battery voltage

When the clamp is connected to the vehicle, the vehicle battery will not have any impact on the external battery voltage, nor will it have any impact on the circuit. $V_x$ is still calculated based on the equivalent resistance $R_{xa}$ of the vehicle dashboard and other electrical equipment (that is when the vehicle is calculated without a battery).

When a vehicle battery is connected and the positive and negative polarities of the clamp are inconsistent with the initial default polarities:

$R_{xa}$ of the electrical equipment such as the vehicle dashboard that is reversely connected→0, and the vehicle battery that is reversely connected will absorb the current of the external battery, which is equivalent to an effective load, resistance=$R_{xb}$.

Because $R_x=R_{xa}R_{xb}/(R_{xa}+R_{xb})$

Therefore, $R_x \rightarrow 0$. If the resistance value to be calculated is less than the resistance threshold (such as 10Ω. Depending on the connected products, such as different brands and models, the specific resistance threshold can be different), it is determined that the positive and negative electrodes of the vehicle battery to which the first connection clamp 13 and the second connection clamp 14 are connected are inconsistent with the initial default polarities. If the resistance value to be calculated is greater than the resistance threshold (such as 10Ω) and is not trending at infinity, it is determined that the positive and negative electrodes of the vehicle battery to which the first connection clamp 13 and the second connection clamp 14 are connected are consistent with the initial default polarities.

Based on the above description, the circuit of the polarity determining module 11 can determine the positive and negative polarity of the clamps.

Figure 2:
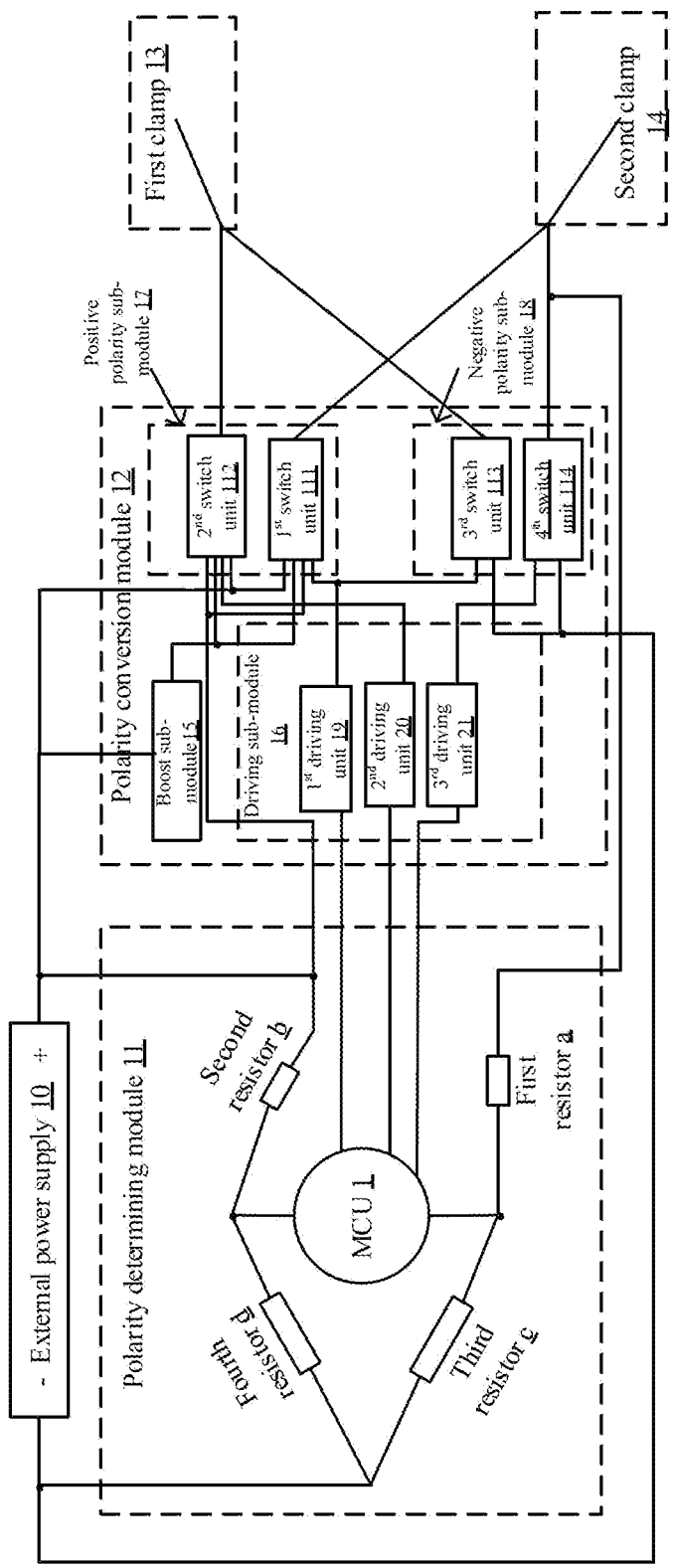
FIG. 2 is a module schematic diagram of a device for adjusting the positive and negative polarities of vehicle charging clamps according to the second embodiment of the present invention.

Furthermore, the second embodiment of the present invention relates to a device for adjusting the positive and negative polarities of clamps for vehicle charging. Please refer to FIG. 2. FIG. 2 shows a module diagram of a device for adjusting the positive and negative polarities of clamps for vehicle charging according to the second embodiment of the present invention. The polarity conversion module comprises a boost sub-module 15, a driving sub-module 16, a positive polarity sub-module 17 and a negative polarity sub-module 18.

The polarity conversion module is configured to control a first switch unit and a third switch unit to be turned on and control a second switch unit and a fourth switch unit to be turned off according to the determining result of the polarity determining module, or control the second switch unit and the fourth switch unit to be turned on and control the first switch unit and the third switch unit to be turned off according to the determining result of the polarity determining module.

The driving sub-module 16 comprises a first driving unit 19, a second driving unit 20 and a third driving unit 21. The positive polarity sub-module 17 comprises a first switch unit 111 and a second switch unit 112, and the negative polarity sub-module 18 comprises a third switch unit 113 and a fourth switch unit 114.

The input of the first driving unit 19 is connected to the third pin of the MCU 1. The output of the first driving unit 19 is connected to the first port of the first switch unit 111 and the first port of the third switch unit 113 respectively.

The input of the second driving unit 20 is connected to the sixth pin of the MCU 1, and the output of the second driving unit 20 is connected to the first port of the second switch unit 112.

The input of the third driving unit 21 is connected to the ninth pin of MCU 1, and the output of the third driving unit 21 is connected to the first port of the fourth switch unit 114.

The second port of the first switch unit 111 and the second port of the second switch unit 112 are both connected to the positive electrode of the external power supply 10, and the third port of the first switch unit 111 and the third port of the second switch unit 112 are both connected to the ninth resistor. The fourth port of the first switch unit 111 and the fourth port of the second switch unit 112 are both connected to one end of the boost sub-module 15, and the second port of the third switch unit 113 and the second port of the fourth switch unit 114 are connected to the negative electrode of the external power supply 10. The fifth port of the first switch unit 111 and the third port of the fourth switch unit 114 are both connected to the second clamp 14, and the fifth port of the second switch unit 112 and the third port of the third switch unit 113 are both connected to the first clamp 13.

The other end of the boost sub-module 15 is also connected to the positive electrode of the external power supply 10.

The boost sub-module 15 is configured to boost the circuit voltage of the first switch unit and the second switch unit.

In this embodiment, the positive polarity sub-module 17 comprises a first switch unit 111 and a second switch unit 112, which are respectively connected to the second clamp 14 and the first clamp 13. The negative polarity sub-module 18 comprises a third switch unit 113 and a fourth switch unit 114, which are respectively connected to the first clamp 13 and the second clamp 14. It is equivalent to have two groups of switch units (the first switch unit and the third switch unit are one group of switch units, the second switch unit and the fourth switch unit are one group of switch units). When one group of switch units is turned on (such as the second switch unit and the fourth switch unit are turned on, the first switch unit and the third switch unit are turned off), correspondingly the first clamp 13 is connected to the positive electrode of the battery, and the second clamp 14 is connected to the negative electrode of the battery. When the other group of switch units is turned on (such as the first switch unit and the third switch unit are turned on, the second switch unit and the fourth switch unit are turned off), correspondingly the first clamp 13 is connected to the negative electrode of the battery, and the second clamp 14 is connected to the positive electrode of the battery. There is no need for the user to manually adjust the first clamp or the second clamp, and the polarities on the two clamps can be automatically switched.

Specifically, when MCU 1 determines, based on determination of the circuit of the polarity determining module 11 (in the initial determination, by sending a low level signal to the third pin of the MCU, a high level signal to the sixth pin, and a high level signal to the ninth pin, it controls all the first switch unit 111, the third switch unit 113, and the fourth switch unit 114 to be turned off, and the second switch unit 112 to be turned on. By adjusting the transmission frequency, the conduction can be controlled to be instantaneous, then the first clamp 13, the second resistor b, and the positive electrode of the external power supply are all connected. $R_8 \to R_X \to$ second switch unit $\to R_9$ forms a loop, and then the resistance Rx between the first clamp 13 and the second clamp 14 is calculated, and according to the value of the resistance Rx, whether the first clamp and the second clamp is connected to the positive electrode or the negative electrode is determined), the first clamp 13 is connected to the negative electrode of the battery, and the second clamp 14 is connected to the positive electrode of the battery, then a signal is sent to the first driving unit 19, the second driving unit 20 and the third driving unit 21 to drive the first switch unit 21 and the third switch unit 23 to be turned on, and to drive the second switch unit 22 and the fourth switch unit 24 to be turned off, so that the first clamp 13 is connected to the negative electrode of the external power supply 10, and the second clamp 14 is connected to the positive electrode of the external power supply 10.

Similarly, when MCU 1 determines based on determination of the circuit of the polarity determining module 11 that the first clamp 13 is connected to the positive electrode and the second clamp 14 is connected to the negative electrode, then a signal is sent to the first driving unit 19, the second driving unit 20 and the third driving unit 21, to drive the first switch unit 21 and the third switch unit 23 to be turned off, and to drive the second switch unit 22 and the fourth switch unit 24 to be turned on, so that the first clamp 13 is connected to the positive electrode of the external power supply 10 and the second clamp 14 is connected to the negative electrode of the external power supply 10.

Specifically, the boost sub-module may include a small MCU, a capacitor, an inductor, an MOS transistor, and a resistor. The connection relationship may be similar to the boost module setting in the prior art. For details, see the boost sub-module 15 in FIG. 4. Here No further details will be given for brevity.

Further, please refer to FIG. 3, which is a detailed circuit diagram of the device for adjusting the positive and negative polarities of the vehicle charging clamp in the present invention. The second switch unit 22 comprises: a first MOS transistor QP1, a second MOS transistor QP4, a first switch resistor RP2 and a second switch resistor RP5. One end of the first MOS transistor QP1 and one end of the second MOS transistor QP4 are connected to the first clamp 13 (as shown in FIG. 3, the drain electrode of the first MOS transistor QP1 and the drain electrode of the second MOS transistor QP4 are connected to the first clamp 13), the other end of the first MOS transistor QP1 and the other end of the second MOS transistor QP4 (the source electrode as shown in FIG. 3) are both connected to the positive electrode of the external battery 10. The another end of the first MOS transistor QP1 (shown as the gate electrode in FIG. 3) is connected to one end of the first switch resistor RP2, and the another end of the second MOS transistor QP4 (shown as the gate electrode in FIG. 3) is connected to the one end of the second switch resistor RP5. The other end of the first switch resistor RP2 and the other end of the second switch resistor RP5 are connected to the second driving unit 20.

Wherein, the first switch resistor RP2 and the second switch resistor RP5 are both gate resistors.

Furthermore, the ports connecting the first MOS transistor QP1 and the second MOS transistor QP4 in the second switch unit to the first clamp 13 can also be further connected to a current limiting resistor (R35 in FIG. 3, and the other end of R35 is grounded, that is, the negative electrode of the external power supply). In this preferred embodiment, connecting the current limiting resistor can stabilize the current and provide overvoltage protection, improving the stability and safety of the circuit.

Please continue to refer to FIG. 3. The fourth switch unit comprises a third MOS transistor QN3, a fourth MOS transistor QN4, a third switch resistor RN1 and a fourth switch resistor RN4. One end of the third MOS transistor QN3 and one end of the fourth MOS transistor QN4 (drain electrode as shown in FIG. 3) are connected to the second clamp 14, and the other end of the third MOS transistor QN3 and the other end of the fourth MOS transistor QN4 (such as source electrode shown in FIG. 3) are connected to the negative electrode of the external battery 10, and the another end of the third MOS transistor QN3 (the gate electrode shown in FIG. 3) is connected to one end of the third switch resistor RN1. The another end of the fourth MOS transistor QN4 (the gate electrode as shown in FIG. 3) is connected to one end of the fourth switch resistor RN4. The other end of the third switch resistor RN1 and the other end of the fourth switch resistor RN4 are connected to the third driving unit 21.

Specifically, the first switch unit 21 and the second switch unit 22 are mirror circuits, the third switch unit 23 and the fourth switch unit 24 are mirror circuits. The first switch unit 22 also comprises two MOS transistors QP2 and QP3 and two resistors RP3 and RP4. The third switch unit 23 also comprises two MOS transistors QN1 and QN2, and two resistors RN2 and RN3.

Specifically, the first switching unit comprises a fifth MOS transistor QP2, a sixth MOS transistor QP3, a fifth switch resistor RP3 and a sixth switch resistor RP4. One end of the fifth MOS transistor QP2 and one end of the sixth MOS transistor QP3 are connected to the second clamp 14, and the other end of the fifth MOS transistor QP2 and the other end of the second MOS transistor are connected to the positive electrode of the external battery 10. The another end of the fifth MOS transistor QP2 is connected to one end of the fifth switch resistor RP3, the another end of the sixth MOS transistor QP3 is connected to one end of the sixth switch resistor RP4. The other end of the fifth switch resistor RP3 and the other end of the sixth switch resistor RP4 are both connected to the first driving unit 19.

The third switching unit comprises: a seventh MOS transistor QN1, an eighth MOS transistor QN2, a seventh switch resistor RN3 and an eighth switch resistor RN2. One end of the seventh MOS transistor QN1 and one end of the eighth MOS resistor QN2 are connected to the first clamp 13, and the other end of the seventh MOS transistor QN1 and the other end of the eighth MOS transistor QN2 are connected to the negative electrode of the external battery 10. Another end of the seventh MOS transistor QN1 is connected to one end of the seventh switch resistor RN3.

Another end of the eighth MOS transistor QN2 is connected to one end of the eighth switch resistor RN2. The other end of the seventh switch resistor RN3 and the other end of the eighth switch resistor RN2 are connected to the first driving unit 19. Similarly, one ends of the MOS transistors QP2 and QP3 can be connected to the current limiting resistor R34.

Further, please continue to refer to FIG. 3. The first driving unit 19 comprises a fifth resistor R41, a sixth resistor R46, a first transistor Q7, a first pull-up resistor R31, a seventh resistor R36, an eighth resistor R38, a first driving MOS transistor Q3, a second driving MOS transistor Q5, a ninth resistor, a first diode ZD3, a tenth resistor R44, an eleventh resistor R43, a third driving MOS transistor Q11, a fourth driving MOS transistor Q12, a twelfth resistor R33, and a second diode D11.

One end of the fifth resistor R41 is connected to the third pin of the microcontroller unit U2, and the other end of the fifth resistor R41 is connected to the sixth resistor R46 and one end of the first transistor Q7 respectively. The other end of the sixth resistor R46 is connected to the ground. The other end of the first transistor Q7 is connected to the ground, and the another end of the first transistor Q7 is connected to one end of the first pull-up resistor R31. The other end of the pull-up resistor R31 is connected to the positive electrode of the external power supply 10.

Among them, the fifth resistor R41 and the sixth resistor R46 are the driving resistors of the first transistor Q7, and the seventh resistor R36 and the eighth resistor R38 are gate resistors.

The another end of the first transistor Q7 is also connected to both the seventh resistor R36 and the eighth resistor R38. The other end of the seventh resistor R36 is connected to one end of the first driving MOS transistor Q3 (shown as the gate electrode in FIG. 3), and the other end of the eighth resistor R38 is connected to one end of the second driving MOS transistor Q5 (shown as the gate electrode in FIG. 3). The other end of the first driving MOS transistor Q3 and the second driving MOS transistor Q5 (as shown source electrode in FIG. 3) are both grounded, and the another ends of the first driving diode Q3 and the second driving diode Q5 (shown as drain electrode in FIG. 3) are also connected to the first switch unit 111. The another ends of the first driving diode Q3 and the second driving diode Q5 (shown as drain electrode as shown in FIG. 3) are also connected to one end of the ninth resistor. The other end of the ninth resistor is also connected to the cathode of the first diode ZD3. The first diode D8 may be a Zener diode D8, and its positive electrode is also connected to the positive electrode of the external power supply 10. At the same time, please continue to refer to FIG. 3. In FIG. 3, the boost sub-module 15 delivers the boosted voltage to the gates of the MOS transistors QP2 and MOS transistors QP3 in the first switch unit 111 through the resistor R26 and the diode D9, so that when the second switch unit 21 is turned on, the MOS transistor QP2 and the MOS transistor QP3 in the first switch unit 111 can be turned on.

The another end of the first transistor Q7 is also connected to the tenth resistor R44 and the eleventh resistor R43, and the other end of the tenth resistor R44 is connected to one end of the third driving MOS transistor Q11. The other end of the eleventh resistor R43 is connected to one end of the fourth driving MOS transistor Q12. The other ends of the third driving MOS transistor Q11 and the fourth driving MOS transistor Q12 are both grounded. Another ends of the third driving diode Q11 and the fourth driving diode Q12 are also connected to the third switch unit 113, and the another ends of the third driving MOS transistor Q11 and the fourth driving MOS transistor Q12 are also connected to one end of the twelfth resistor R33. The other end of the twelfth resistor R33 is also connected to the cathode of the second diode D11, and the anode of the second diode D11 is also connected to the positive electrode of the external power supply 10.

Further, the first diode ZD3, the second diode D11 and the first pull-up resistor R31 are also connected to the ground respectively. Specifically, the first diode ZD3, the second diode D11 and the first pull-up resistor R31 can be connected to the ground through the capacitor C16, the capacitor C20 and the capacitor C19 respectively as shown in FIG. 3. In this preferred embodiment, the capacitor can play a filtering role.

Specifically, the second driving unit 20 comprises a thirteenth resistor R40, a fourteenth resistor R47, a second transistor Q8, a second pull-up resistor R30, a fifteenth resistor R37, a sixteenth resistor R39, a fifth driving MOS transistor Q4, a sixth driving MOS transistor Q6, a seventeenth resistor R29, and a third diode D8.

One end of the thirteenth resistor R40 is connected to the third pin of the microcontroller unit U2, and the other end of the thirteenth resistor R40 is connected to one ends of the fourteenth resistor R47 and the second transistor Q8 respectively. The other end of the resistor R47 is connected to the ground, the other end of the second transistor Q8 is connected to the ground, and the another end of the second transistor Q8 is connected to one end of the second pull-up resistor R30. The other end of the second pull-up resistors R30 is connected to the positive electrode of the external power supply 10, and the another end of the second transistor Q8 is also connected to both the fifteenth resistor R37 and the sixteenth resistor R39. The other end of the fifteenth resistor R37 is connected to one end of the fifth driving MOS transistor Q4 (the gate electrode as shown in FIG. 3), and the other end of the sixteenth resistor R39 is connected to one end of the sixth driving MOS transistor Q6 (the gate electrode as shown in FIG. 3). The other ends of the fifth driving MOS transistor Q4 and the sixth driving MOS transistor Q6 (as shown in FIG. 3 as the source electrode) are both grounded, and the another ends of the fifth driving MOS transistor Q4 and the sixth driving MOS transistor Q6 (drain electrode as shown in FIG. 3) are also connected to the second switch unit 112. The another ends of the fifth driving MOS transistor Q4 and the sixth driving MOS transistor Q6 (the drain electrode as shown in FIG. 3) are also connected to one end of the seventeenth resistor R29, and the other end of the seventeenth resistor R29 is also connected to the cathode of the third diode D8. The third diode D8 may be voltage-stabilizing diode, and its anode is also connected to the positive electrode of the external power supply 10. Please continue to refer to FIG. 3. The boosted voltage by the boost sub-module 15 can be directly transmitted to the gate of the first MOS transistor QP1 and the second MOS transistor QP4 in the second switch unit 22 through the resistor R27 and the diode ZD4, so that when the second switch unit 22 is turned on, the first MOS transistor QP1 and the second MOS transistor QP4 in the second switch unit 22 can be turned on.

Specifically, the third driving unit 21 comprises: an eighteenth resistor R45, a nineteenth resistor R42, a seventh driving MOS transistor Q9, an eighth driving MOS transistor Q10, a twentieth resistor R32, and a fourth diode D10.

The ninth pin of the MCU U2 is connected to both the eighteenth resistor R45 and the nineteenth resistor R42, and the other end of the eighteenth resistor R45 is connected to one end of the seventh driving MOS transistor Q9. The other end of the nineteenth resistor R42 is connected to one end of the eighth driving MOS transistor Q10. The other ends of the seventh driving MOS transistor Q9 and the eighth driving MOS transistor Q10 are both grounded. The another ends of the seventh driving MOS transistor Q9 and the eighth driving MOS transistor Q10 are also connected to the fourth switch unit 114. The another ends of the seventh driving MOS transistor Q9 and the eighth driving MOS transistor Q10 are connected to one end of the twentieth resistor R32, the other end of the twentieth resistor R32 is also connected to the cathode of the fourth diode D10, and the anode of the fourth diode D10 is also connected to the positive electrode of the external power supply 10.

Further, the third diode D8, the fourth diode D10 and the second pull-up resistor R30 are also connected to the ground respectively. Specifically, the third diode D8, the fourth diode D10 and the second pull-up resistor R30 can be connected to the ground through the capacitor C17, the capacitor C18 and the capacitor C19 respectively as shown in FIG. 3. In this preferred embodiment, the capacitor can play a filtering role.

In this embodiment, when the first switch unit 111 needs to be turned on, the MCU U2 sends a high level signal to Q7 in the first driving unit 19 through the sixth pin. At this time, Q7 is turned on and grounded, and then the pull-up voltage passed through R31 is directly grounded through Q7. Then the voltage at R36 and R37 has no power supply voltage and no high level. At this time, Q3 and Q5 cannot be turned on because they are in low level, so the voltage of the external power supply 10 does not pass through the MOS transistor Q3 and Q5 to the ground after passing through D9 and R28, but directly enters the MOS transistors QP3 and QP4. At the same time, the boost of the boost sub-module results in the voltage at the gates of the MOS transistors QP2 and QP3 being higher than that at the drains, and QP2 and QP3 are turned on.

Similarly, when the first switch unit 111 needs to be turned off, the MCU U2 sends a low level signal to Q7 in the first driving unit 19 through the sixth pin. At this time, Q7 cannot be turned on, and the pull-up voltage of R31 cannot be connected to the ground through Q7, then the voltage at R36 and R 37 is the pull-up voltage. The MOS transistors Q3 and Q5 can be turned on. After the MOS transistors Q3 and Q5 are turned on, the voltage of the positive electrode of the external power supply 10 connected through R28 is directly connected to the ground through the MOS transistors Q3 and Q5, and the MOS transistors QP2 and QP3 cannot be provided with the voltage to turn on the MOS transistors QP2 and QP3. The MOS transistors QP2 and QP3 are both turned off, therefore, the first switch unit 111 is turned off.

Similarly, when the third pin of the MCU U 2 sends a high level signal, the third switch unit is turned on, and when it sends a low level signal, the third switch unit is turned off. When the sixth pin of the microcontroller sends a high level signal, the second switch unit is turned on, and when it sends a low level signal, the second switch unit is turned off. When the ninth pin of the microcontroller sends a high level signal, the fourth switch unit is turned off, and when it sends a low level signal, the fourth switch unit is turned on. The specific principle is consistent with the above description. No further details will be given here for brevity.

Further, the device for adjusting the positive and negative polarities of the vehicle charging clamp may also include diode D 14, diode D16, diode D17, resistor R54, resistor R55, resistor R57, resistor R58, diode D15, diode D13, diode D 12, resistor R48, resistor R49, resistor 50, resistor R52, resistor R51, MOS transistor Q13, resistor R53, resistor R56 as shown in FIG. 3. Their connection relationship is shown in FIG. 3. In this preferred embodiment, through the connection of these components, circuit protection can be provided to the circuit. Specifically, resistors R54, R55, R57, and R58 are all gate resistors. Resistor R53 is the gate pull-up resistor of MOS transistor Q13, and resistor R56 is the pull-down resistor. When MOS transistor Q7 or MOS transistor Q8 is turned off respectively, MOS transistor Q13 can be turned on anyway.

Furthermore, the device for adjusting the positive and negative polarities of the vehicle charging clamp can also include D6, D7 and RP1 as shown in FIG. 3. Their connection relationship in the figure can play a role in circuit protection.

Further, in FIG. 3, BAT+ is the positive electrode of the external power supply, BAT− is the negative electrode of the external power supply. The left side of the pins of the MCU U2 is the first to eighth pins from top to bottom, and the right side pins are the ninth to sixteenth pins respectively from bottom to top. The above-mentioned eighth resistor can correspond to $R_8 + R_{12}$ in the figure, the ninth resistor can correspond to $R_9 + R_{14}$, the fourth resistor $R_{17}$, and the third resistor $R_{16}$ in the figure, and they form a bridge resistance.

Furthermore, the device for adjusting the positive and negative polarities of the vehicle charging clamp can also include resistors $R_{15}$ and $R_{10} + R_{13}$ as shown in FIG. 3, which are configured to measure the voltage in the circuit and improve circuit safety.

Figure 4:
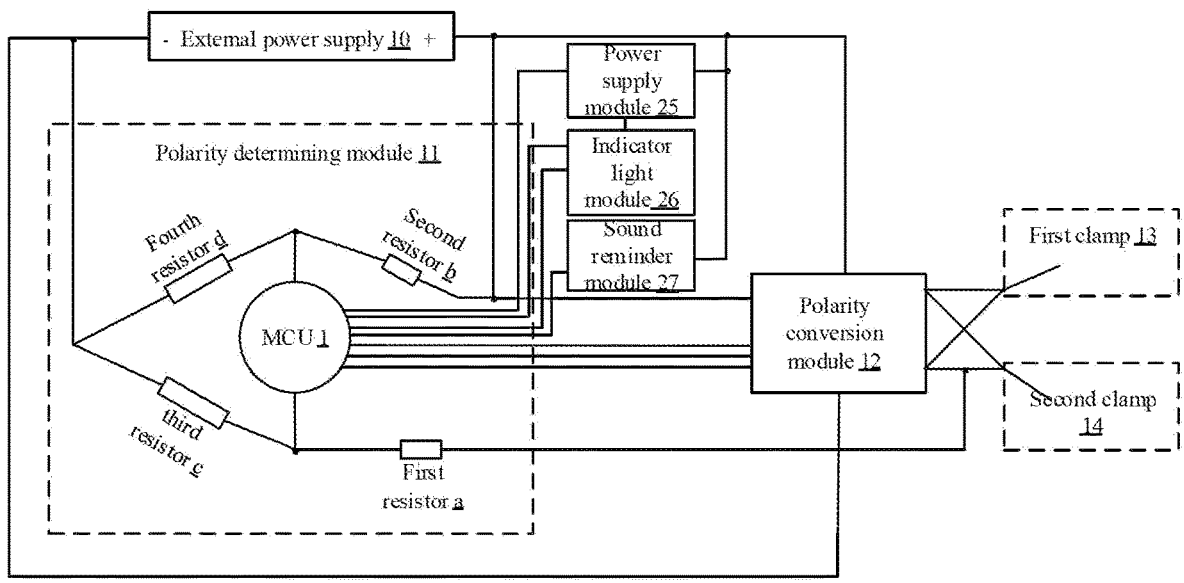
FIG. 4 is a schematic module diagram of a device for adjusting the positive and negative polarities of vehicle charging clamps according to the third embodiment of the present invention.

Further, please refer to FIG. 4. FIG. 4 is a module schematic diagram of a device for adjusting the positive and negative polarities of vehicle charging clamps according to a third embodiment of the present invention. The device for adjusting the positive and negative polarities of vehicle charging clamps also comprises: power supply module 25. One end of the power supply module 25 is connected to the first pin of the microcontroller unit 1, and the other end of the power supply module 25 is configured to connect the positive electrode of the external power supply 10. The power supply module is configured to supply power to the microcontroller unit.

For details, please continue to refer to FIG. 3. In FIG. 3, the power supply module 25 comprises a diode D1, a capacitor C2 and a voltage regulator U1. One end of the diode D1 is connected to the positive electrode of the external power supply, the other end of the diode D1 is connected to one ends of the voltage regulator U1 and the capacitor C2, and the other end of the voltage regulator U1 is connected to the first pin of the microcontroller unit U2. At the same time, the other end of the capacitor C2 is connected to the negative electrode of the power supply.

In this embodiment, when the power is turned on, the power supply module 25 starts to work, and the voltage regulator U1 can stabilize the power supply to 5 V to supply power to the microcontroller unit U2.

Further, please continue to refer to FIG. 4. In an optional embodiment of the present invention, the vehicle starting device further comprises: an indicator light module 26. The first port and the second port of the indicator light module 26 are respectively connected to the different pins of the microcontroller unit 1 (e.g., the second pin and the thirteenth pin of the microcontroller unit U 1 as shown in FIG. 5), and the third port of the indicator module is configured to connect the power supply module 25. The indicator light module 25 is configured to light up to indicate whether the vehicle battery is connected to the external power supply.

Specifically, when the microcontroller unit determines that the positive and negative polarities of the first clamp and the second clamp are connected correctly to the positive and negative polarities of the external power supply and the circuits are turned on, or determines that they are not connected to the external power supply, the microcontroller unit sends a control signal to the indicator light module, so that the indicator light module lights up for indication.

Further, please continue to refer to FIG. 3. In an optional embodiment of the present invention, the indicator light module comprises a first light-emitting diode D2, a first indication resistor R1, a second light-emitting diode D3 and a second indication resistor R3.

One end of the first indication resistor R1 is connected to the thirteenth pin of the microcontroller unit, and the other end of the first indication resistor R1 is connected to one end of the first light-emitting diode D2, and the other end of the first light-emitting diode D2 is connected to the power supply module 25. Specifically, the other end of the first light-emitting diode D2 is connected to the voltage regulator U1 in the power supply module 25.

One end of the second indication resistor R3 is connected to the second pin of the microcontroller unit 1, and the other end of the second indication resistor R3 is connected to one end of the second light-emitting diode D3. The other end of the light-emitting diode D3 is connected to the power supply module 25. Specifically, the other end of the second light-emitting diode D3 is connected to the voltage regulator U 1 in the power supply module 25.

Specifically, the on-off state of the first light-emitting diode and the second light-emitting diode can be controlled by the high-level or low-level output of the microcontroller unit U2.

Among them, the first indication resistor R1 and the second indication resistor R3 are both current-limiting resistors to ensure that the current flowing through the light-emitting diode is below the rated current.

For example, the first light-emitting diode is configured to light a green light, and the second light-emitting diode is configured to light a red light. When it is detected that the positive and negative polarities of the first clamp and the second clamp are connected correctly and connected to the external power supply to turn on the circuits, the microcontroller unit sends a high-level signal to the first light-emitting diode and a low-level signal to the second light-emitting diode. Then the first light-emitting diode lights up green, and the second light-emitting diode does not light up. When it detects that there is no connection with the external power supply, the microcontroller unit sends a low-level signal to the first light-emitting diode and a high-level signal to the second light-emitting diode, then the first light-emitting diode does not light up and the second light-emitting diode lights up red.

Further, please continue to refer to FIG. 4. In an optional embodiment of the present invention, the vehicle starting device further comprises: a sound reminder module 27. One end of the sound reminder module 27 is connected to a pin of the MCU 1, and the other end of the sound reminder module 27 is configured to connect to the positive electrode of the external power supply 10. The sound reminder module 27 is configured to send a sound reminder when the MCU detects that a preset event occurs.

Specifically, when a preset event is detected, the microcontroller unit sends a signal to the sound reminder module 27, so that the sound reminder module performs a sound reminder.

Specifically, the preset event can be an event such as a short circuit, external power supply, or excessive temperature of the vehicle battery.

Further, please continue to refer to FIG. 3. The sound reminder module 27 comprises a first reminder resistor R5, a second reminder resistor R11, a third transistor Q1 and a buzzer BEE1, wherein one end of the first reminder resistor R5 is configured to connect to the positive electrode of the external power supply 10, and the other end of the first reminder resistor R5 is connected to one end of the buzzer BEE1. The other end of the buzzer BEE1 is connected to one end of the third transistor Q1 (the collector electrode as shown in FIG. 5), and the other end of the third transistor Q1 (the emitter electrode as shown in FIG. 5) is connected to the negative electrode of the external power supply 10, and the another end of the third transistor Q1 (the base electrode as shown in FIG. 5) is connected to one end of the second reminder resistor R11. The other end of the second reminder resistor R11 is connected to the fifth pin of the microcontroller unit U2.

In this embodiment, the seventh resistor R5 and the second reminder resistor R11 are current-limiting resistors. When a preset event is detected, the microcontroller unit sends a high-level signal to the base of transistor Q1, thereby applying a forward voltage between the base and the emitter, transistor Q1 is turned on, and the BEE1 buzzer provides sound reminder.

The above embodiments can automatically identify the positive and negative polarities of the vehicle battery to which the charging clamp are connected when the vehicle emergency power supply is configured to be charged, and automatically switch the positive and negative polarities of the charging clamps to match the polarities of the vehicle battery, without the need to mark the positive and negative polarities of the vehicle emergency power supply in advance. There is no need to manually adjust the connection to the positive and negative electrodes when the clamp is reversely connected to the vehicle emergency power supply, which improves charging efficiency and safety.

A third embodiment of the present invention relates to a starting system. The starting system comprises an external power supply and a device for adjusting the positive and negative polarities of the vehicle charging clamps described above.

In the embodiment of the present invention, the device for adjusting the positive and negative polarities of the vehicle charging clamps is used together with an external power supply to charge the vehicle battery, and no matter which one of the two clamps is connected to the positive electrode of the vehicle battery and which one is connected to the negative electrode, it can automatically determine the polarities corresponding to the clamps and automatically switch clamps' polarity to the correct polarities which match to that of the battery for charging. The technical principles are the same as mentioned before and will not be repeated here.

In the above-mentioned embodiments, the descriptions of various embodiments have their own emphasis. For elements that are not described in detail in a certain embodiment, reference may be made to related descriptions of other embodiments.

The foregoing is the description of the smart jumper cable, the control method and the jump start apparatus according to the present disclosure. Modifications may be made by those skilled in the art to the detailed implementations and the applications under the spirit of the embodiments of the present disclosure. In summary, the contents of the descriptions should not be construed as a limitation to the present disclosure.

The invention claimed is:

1. A device for adjusting positive and negative polarities of clamps for vehicle charging, comprising: a polarity determining module, a polarity conversion module having a first input and two outputs, a first clamp and a second clamp;

wherein the polarity determining module comprises a first resistor, a second resistor, a third resistor, a fourth resistor and a Microcontroller unit (MCU), wherein an eighth pin of the MCU is connected to one end of the second resistor and one end of the fourth resistor respectively, an other end of the fourth resistor is configured to connect to a negative electrode of an external power supply, and an other end of the second resistor is connected to the first input of the polarity conversion module, the other end of the second resistor is further configured to connect to a positive electrode of the external power supply, an eleventh pin of the MCU is respectively connected to one end of the first resistor and one end of the third resistor, an other end of the third resistor is configured to connect to the negative electrode of the external power supply, and an other end of the first resistor is connected to the second clamp;

wherein the polarity determining module is configured to determine positive and negative polarities of two electrodes of a vehicle battery to which the first clamp and the second clamp are respectively connected;

wherein the polarity conversion module further includes a second input, a third input and a fourth input respectively connected to different pins of the MCU, and the two outputs of the polarity conversion module are both connected to the first clamp and to the second clamp;

wherein the polarity conversion module is configured to control the positive and negative polarities adjustment according to the determining result of the polarity determining module so that the first clamp and the second clamp are respectively connected with the positive electrode and the negative electrode of the external power supply and circuits are turned on for vehicle charging, or the first clamp and the second clamp are respectively connected with the negative electrode and the positive electrode of the external power supply and circuits are turned on for vehicle charging; and wherein the first clamp and the second clamp are configured to connect to the two electrodes of the vehicle battery respectively.

2. The device of claim 1, wherein the polarity conversion module comprises a boost sub-module, a driving sub-module, a positive polarity sub-module and a negative sub-module, wherein the driving sub-module comprises a first driving unit, a second driving unit and a third driving unit, the positive polarity sub-module comprises a first switch unit and a second switch unit each of which has a first terminal, a second terminal, a third terminal, a fourth terminal and a fifth terminal, the negative polarity sub-module comprises a third switch unit and a fourth switch unit each of which has a first terminal, a second terminal and a third terminal;

wherein the polarity conversion module is configured to control the first switch unit and the third switch unit to be turned on and to control the second switch unit and the fourth switch unit to be turned off according to the determining result of the polarity determining module, or to control the second switch unit and the fourth switch unit to be turned on and to control the first switch unit and the third switch unit to be turned off according to the determining result of the polarity determining module;

wherein the first driving unit has an input end connected to a third pin of the MCU, and an output end connected both to the first terminal of the first switch unit and the first terminal of the third switch unit;

wherein the second driving unit has an input end connected to a sixth pin of the MCU, and an output end connected to the first terminal of the second switch unit;

wherein the third driving unit has an input end connected to a ninth pin of the MCU, and an output end connected to the first terminal of the fourth switch unit;

wherein the second terminal of the first switch unit and the second terminal of the second switch unit are both connected to the positive electrode of the external power supply, and the third terminal of the first switch unit and the third terminal of the second switch unit are connected to the second resistor, the fourth terminal of the first switch unit and the fourth terminal of the second switch unit are connected to one end of the boost sub-module, and the second terminal of the third switch unit and the second terminal of the fourth switch unit are connected to the negative electrode of the external power supply, the fifth terminal of the first switch unit and the third terminal of the fourth switch unit are both connected to the second clamp, and the fifth terminal of the second switch unit and the third terminal of the third switch unit are both connected to the first clamp;

wherein the other end of the boost sub-module is also connected to the positive electrode of the external power supply; and wherein the boost sub-module is configured to boost the circuit voltage of the first switch unit and the second switch unit.

3. The device of claim 2, wherein the first driving unit comprises: a fifth resistor, a sixth resistor, a first transistor, a first pull-up resistor, a seventh resistor, an eighth resistor, a first driving MOS transistor, a second driving MOS transistor, a ninth resistor, a first diode, a tenth resistor, an eleventh resistor, a third driving MOS transistor, a fourth driving MOS transistor, a twelfth resistor, a second diode;

wherein one end of the fifth resistor is connected to the sixth pin of the MCU, and an other end of the fifth resistor is connected to one end of the sixth resistor and one end of the first transistor respectively; an other end of the sixth resistor is grounded, an other end of the first transistor is grounded; an another end of the first transistor is connected to one end of the first pull-up resistor; an other end of the first pull-up resistor is connected to the positive electrode of the external power supply;

wherein the another end of the first transistor is also connected to one end of the seventh resistor and the eighth resistor, and an other end of the seventh resistor is connected to one end of the first driving MOS transistor, an other end of the eighth resistor is connected to one end of the second driving MOS transistor, other ends of the first driving MOS transistor and the second driving MOS transistor are both grounded, an another end of the first driving diode and an another end of the second driving diode are also connected to the second switch unit, and the another end of the first driving diode and the another end of the second driving diode are also connected to one end of the ninth resistor, an other end of the ninth resistor is also connected to a cathode of the first diode, and an anode of the first diode is also connected to the positive electrode of the external power supply;

wherein the another end of the first transistor is also connected to one end of the tenth resistor and one end of the eleventh resistor, an other end of the tenth resistor is connected to one end of the third driving MOS transistor, an other end of the eleventh resistor is connected to one end of the fourth driving MOS transistor, other ends of the third driving MOS transistor and the fourth driving MOS transistor are both grounded, another ends of the third driving MOS transistor and the fourth driving MOS transistor are also connected to the fourth switch unit, and the another ends of the third driving MOS transistor and the fourth driving MOS transistor are also connected to one end of the twelfth resistor, an other end of the twelfth resistor is also connected to a cathode of the second diode, and an anode of the second diode is connected to the positive electrode of the external power supply;

wherein the second driving unit comprises: a thirteenth resistor, a fourteenth resistor, a second transistor, a second pull-up resistor, a fifteenth resistor, a sixteenth resistor, a fifth driving MOS transistor, a sixth driving MOS transistor, a seventeenth resistor, a third diode;

wherein one end of the thirteenth resistor is connected to the third pin of the MCU, an other end of the thirteenth resistor is connected to one end of the fourteenth resistor and one end of the second transistor respectively, and an other end of the fourteenth resistor is grounded, and an other end of the second transistor is grounded, an another end of the second transistor is connected to one end of the second pull-up resistor, an other end of the second pull-up resistor is connected to the positive electrode of the external power supply, and the another end of the second transistor is also connected to both one end of the fifteenth resistor and one end of the sixteenth resistor; an other end of the fifteenth resistor is connected to one end of the fifth driving MOS transistor; an other end of the sixteenth resistor is connected to one end of the sixth driving MOS transistor, other ends of the fifth driving MOS transistor and the sixth driving MOS transistor are both grounded, an another end of fifth driving MOS transistor and an another end of the sixth driving MOS transistor are also connected to the second switch unit, and the another end of the fifth driving MOS transistor and the another end of the sixth driving MOS transistor are also connected to one end of the seventeenth resistor, an other end of the seventeenth resistor is also connected to a cathode of a third diode; the third diode is voltage-stabilizing diode and its anode is connected to the positive electrode of the external power supply;

wherein the third driving unit comprises: an eighteenth resistor, a nineteenth resistor, a seventh driving MOS transistor, an eighth driving MOS transistor, a twentieth resistor, and a fourth diode; and wherein a ninth pin of the MCU is connected to both the eighteenth resistor and the nineteenth resistor; an other end of the eighteenth resistor is connected to one end of the seventh driving MOS transistor; the other end of the nineteenth resistor is connected to one end of the eighth driving MOS transistor, other ends of the seventh driving MOS transistor and the eighth driving MOS transistor are both grounded, and an another end of the seventh driving MOS transistor and an another end of the eighth driving MOS transistor are also connected to the fourth switch unit, and the another end of the seventh driving MOS transistor and the another end of the eighth driving MOS transistor are also connected to one end of the twentieth resistor; an other end of the twentieth resistor is also connected to a cathode of the fourth diode, and an anode of the fourth diode is also connected to the positive electrode of the external power supply.

4. The device of claim 1, wherein the second switch unit comprises: a first MOS transistor, a second MOS transistor, a first switch resistor and a second switch resistor; one end of the first MOS transistor and one end of the second MOS transistor are connected to the first clamp, an other end of the first MOS transistor and an other end of the second MOS transistor is connected to the positive electrode of the external battery, an another end of the first MOS transistor is connected to one end of the first switch resistor, an another end of the second MOS transistor is connected to one end of the second switch resistor, other ends of the first switch resistor and the second switch resistor are both connected to the second driving unit;

wherein the fourth switch unit comprises a third MOS transistor, a fourth MOS transistor, a third switch resistor and a fourth switch resistor; one end of the third MOS transistor and one end of the fourth MOS transistor are connected to the second clamp, other ends of the third MOS transistor and the fourth MOS transistor are connected to the negative electrode of the external battery, an another end of the third MOS transistor is connected to one end of the third switch resistor, and an another end of the fourth MOS transistor is connected to one end of the fourth switch resistor, and other ends of the third switch resistor and the fourth switch resistor are connected to the third driving unit;

wherein the first switch unit comprises: a fifth MOS transistor, a sixth MOS transistor, a fifth switch resistor and a sixth switch resistor; one end of the fifth MOS transistor and one end of the sixth MOS transistor are connected to the second clamp, other ends of the fifth MOS transistor and the second MOS transistor are connected to the positive electrode of the external battery, and an another end of the fifth MOS transistor is connected to one end of the fifth switch resistor, an another end of the sixth MOS transistor is connected to one end of the sixth switch resistor, and other ends of the fifth switch resistor and the sixth switch resistor are both connected to the first driving unit; and wherein the third switch unit comprises: a seventh MOS transistor, an eighth MOS transistor, a seventh switch resistor and an eighth switch resistor; one end of the seventh MOS transistor and one end of the eighth MOS transistor are connected to the first clamp, other ends of the seventh MOS transistor and the eighth MOS transistor are connected to the negative electrode of the external battery, an another end of the seventh MOS transistor is connected to one end of the seventh switch resistor, and an another end of the eighth MOS transistor is connected to one end of the eighth switch resistor, and other ends of the seventh switch resistor and the eighth switch resistor are both connected to the first driving unit.

5. The device of claim 1, wherein the device further comprises: a power supply module; one end of the power supply module is connected to the first pin of the MCU, and an other end of the power supply module is configured to connect to the positive electrode of the external power supply.

6. The device of claim 5, wherein the device further comprises: an indicator light module having a first terminal, a second terminal and a third terminal, the first terminal and the second terminal of the indicator light module are respectively connected to different pins of the MCU, and the third terminal of the indicator light module is connected to the power supply module; and wherein the indicator light module is configured to light up to indicate whether the vehicle battery is connected to the external power supply for charging.

7. The device of claim 6, wherein the indicator light module comprises a first light-emitting diode, a first indication resistor, a second light-emitting diode and a second indication resistor;

wherein one end of the first indication resistor is connected to a thirteenth pin of the MCU, an other end of the first indication resistor is connected to one end of the first light-emitting diode, and an other end of the first light-emitting diode is connected to the power supply module; and wherein one end of the second indication resistor is connected to a second pin of the MCU, an other end of the second indication resistor is connected to one end of the second light-emitting diode, and an other end of the second light-emitting diode is connected to the power supply module.

8. The device of claim 1, wherein the device further comprises: a sound reminder module, one end of the sound reminder module is connected to one pin of the MCU, and an other end of the sound reminder module is configured to connect to the positive electrode of the external power supply; and wherein the sound reminder module is configured to give a sound reminder when the MCU detects an occurrence of a preset event.

9. The device of claim 8, wherein the sound reminder module comprises a first reminder resistor, a second reminder resistor, a third transistor and a buzzer; wherein one end of the first reminder resistor is connected to the positive electrode of the external power supply, an other end of the first reminder resistor is connected to one end of the buzzer, an other end of the buzzer is connected to one end of the third triode, an other end of the third triode is connected to the negative electrode of the external power supply, an another end of the third triode is connected to one end of the second reminder resistor, and an another end of the second reminder resistor is connected to the fifth pin of the MCU.

10. A starting system, comprising an external power supply and the device for adjusting the positive and negative polarities of clamps for vehicle charging according to claim 1.

* * * * *